Aug. 18, 1942.     J. F. MERKEL     2,293,158
RELAY
Original Filed Aug. 18, 1938
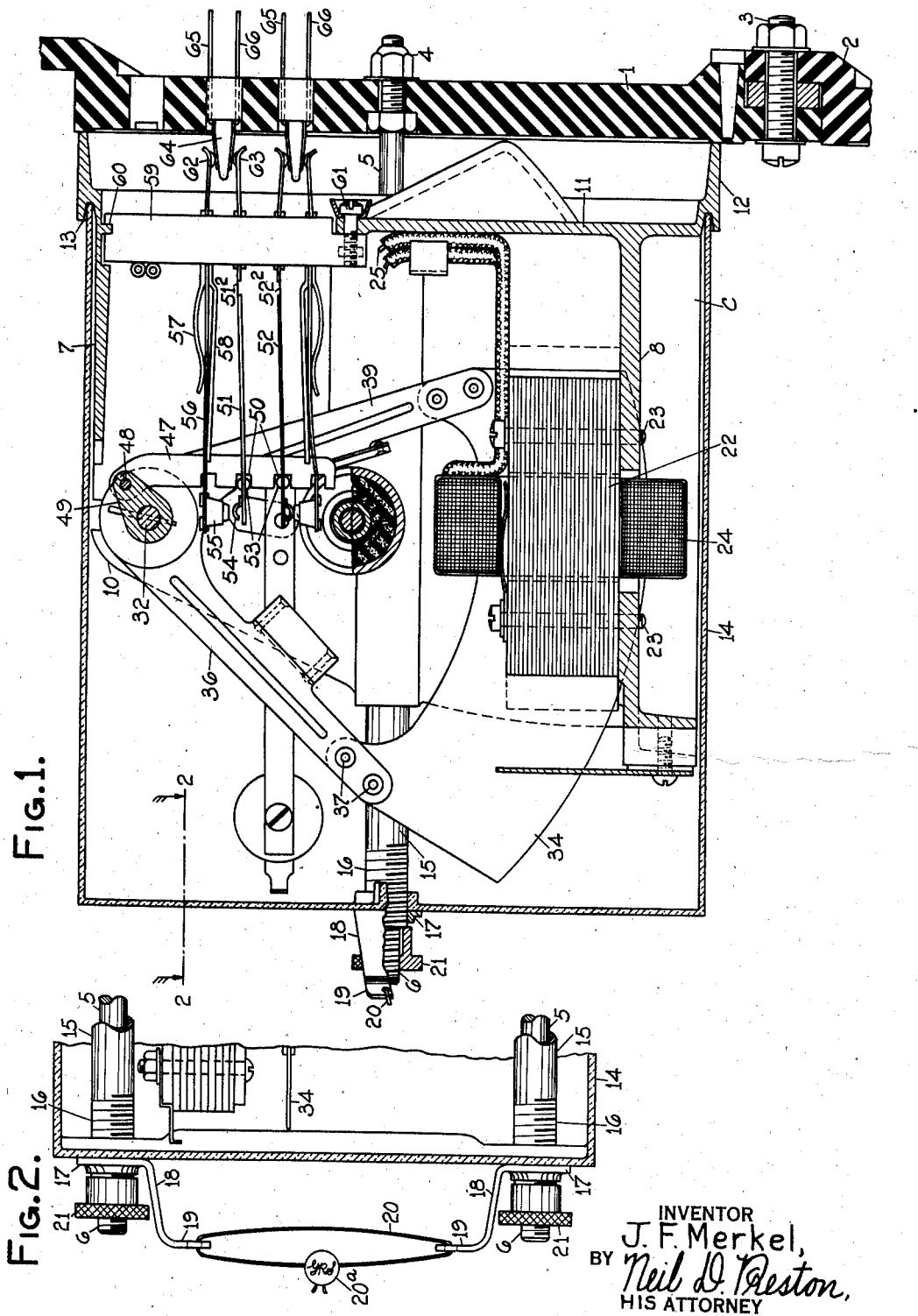
INVENTOR
J. F. Merkel,
BY Neil D. Preston,
HIS ATTORNEY Patented Aug. 18, 1942

2,293,158

UNITED STATES PATENT OFFICE 2,293,158

RELAY

Joseph F. Merkel, Rochester, N. Y., assignor to General Railway Signal Company, Rochester, N. Y.

Original application August 18, 1938, Serial No. 225,545. Divided and this application May 17, 1941, Serial No. 393,980

4 Claims. (Cl. 200—168)

This invention relates in general to electrically operated relays, and has more particular reference to a means for fastening relays to support panels, and to improved contact finger construction.

The present application is a division of my application Ser. No. 225,545, filed August 18, 1938, for "Relays."

Accordingly, one feature of this invention is to provide an improved contact finger construction. Another feature of this invention is the provision of a holding means for the relay, whereby the means for holding the relay to its fixed support, and the means for holding the relay casing in position to cover the relay mechanism within the casing, are unusually conveniently located and compact in their arrangements.

Further objects, purposes and characteristic features of this invention will appear as the description progresses, reference being made to the accompanying drawing showing, solely by way of example, and in no manner whatsoever in a limiting sense, one form which the invention can assume. In the drawing:

Fig. 1 is a sectional side elevation of one form of relay in accordance with this invention.

Fig. 2 is a fragmentary sectional view on line 2—2 of Fig. 1, viewed in the direction of the arrows.

Referring now to the drawing, and first to Fig. 1, there is here shown a relay support rack having sections 1 and 2, interconnected by bolts 3. Fastened to section 1 of the rack, by bolting it thereto as at 4, is a support rod 5, extending forwardly of the relay rack and terminating in a threaded outer end 6. There are two of these rods 5, for supporting each relay, as shown in Fig. 2, for example.

The relay mechanism and operated parts are largely contained in a casting C, of aluminum or other suitable material, and of a general box-like shape, with an open front end. This casting has a top portion 7, a bottom portion 8, with side portions, one of which is shown at 10, and a rear portion 11. The casting, at the rear, also has a bearing portion 12, which rests against the rack member 1, when the relay is fixed in position. In the mechanism casting is an annular groove 13, for receiving the open end of relay casing 14, which can be made of glass, or other suitable, and preferably transparent, material, such as any one of the numerous transparent low temperature plastics which are readily available.

Connected to the mechanism casting are two tubes 15, which receive the holding rods 5, and in turn receive the casing 14, the ends of tubes 15 being threaded, as at 16, to receive nuts 17, for clamping the casing onto the mechanism casting. These nuts 17 have plates 18 connected thereto, which extend forwardly and then inwardly toward each other as at 19, with the portions 19 drilled to receive a wire 20, extending between the two members 19, with the two ends of wire 20 interconnected by a seal or the like 20ᵃ. In this fashion, in order that the casing 14 can be removed from the mechanism casting, it is necessary first to break the seal, in order to remove the nuts 17, and permit the separation of the casing from the mechanism casting.

Projecting through the tubes 15 and the nuts 17 are the holding rods 5, on the threaded outer end 6 of each of which is a holding nut 21, for clamping the relay, including the casing, onto the rods 5.

With the arrangement as just described, it is obvious that the relay can be bodily removed from the relay rack member 1, by merely removing the nuts 21, and without breaking any seal. If, however, it is desired to remove the casing from the mechanism casting, the seal must be broken in order to permit removal of the holding nuts 17.

The magnetic structure employed in this relay is of the type shown and described in the patent to W. K. Howe, No. 1,882,846, granted October 18, 1932, and accordingly, need not be described in any great detail in the present specification. In brief, the magnetic structure involves a member 22, connected to the casting by screws 23, and carrying an energizing winding 24, connected to an external source of energy by two wires 25. Facing the core 22, is a cooperating laminated core structure, not shown.

The vane of this relay is carried by spindle 32, supported by the sides of the mechanism casting, in suitable bearings of the type, if desired, shown as and described in the patent to J. L. Osborne, No. 1,785,702, granted December 16, 1930.

The vane is constituted by a thin arcuate plate 34, of a non-magnetic material such as aluminum, copper, or the like. This plate, in its dimension toward spindle 32, is relatively narrow, so as to just properly cooperate with the magnetic structure by which it is operated.

For supporting the vane on spindle 32, there are employed arms, as 36 and 39, riveted, as at 37, to an end of the vane, where they are received on spindle 32, whereby to make a rigid arm support for the vane.

The contact operating means can be best seen from Fig. 1, and is constituted by a contact operator 47, connected by a pin 48, to a crank arm 49, on the contact operating assembly, and its lower end is connected, by means of notches 50, to movable contact fingers 51 and 52 which carry rollers 53 receivable in the notches. At the outer ends of the contact fingers 51 and 52 are low resistance metal contact points 54 made preferably of silver, and these cooperate with fixed contacts 55 of copper impregnated carbon, or the like, carried by contact fingers 56, having usual pressure and stop plates 57 and 58 respectively. The contact fingers are carried in a block of molded insulating material 59, supported in the mechanism casting at 60 and 61. The contact fingers have projections, such as 62 and 63, to form a socket to receive a plug 64, for electrically connecting each contact finger with a separate wire, as 65 and 66, extending to the rear of the relay rack section 1.

At a point near the contact carrying block 59, the contact fingers 51 and 52 are milled out, as at $51^2$ and $52^2$, to a thinner dimension, whereby to substantially produce a pivot at this point. In this manner the contact fingers 51 and 52 at their outer ends are relatively rigid, and hence, build up a contact pressure with the fixed contacts without any material amount of flexing at their outer ends. With this construction it is possible to build up proper contact pressure without the expenditure of an undue amount of energy.

Thus, a compact arrangement of parts has been provided whereby to remove the casing from the mechanism and casting, a seal must be broken, but to remove the relay from its supporting rack, no seal need be broken, and this arrangement of parts is constituted primarily by supporting rods passing through tubular members on the mechanism casting with both the rods and the tubular members passing through the relay casing.

The above rather specific description of one form which this invention can assume, has been given solely by way of example, and is not intended, in any way whatsoever in a limiting sense. Furthermore, it is to be understood that all such variations and modifications, as come within the scope of the appended claims, are intended to be covered and protected by the present application.

Having described my invention, I now claim:

1. In a relay, in combination, a support rack, a holding rod fixed to the rack and extending forwardly therefrom, a relay mechanism, a casting receiving the mechanism, a tube fixed to the casting, an enclosing casing for the mechanism and casting, the tube extending through one face of the casing to the outside thereof, holding means on the outer end of the tube for clamping the casing to the casting, the rod extending through the tube and projecting beyond said holding means, and means on the outer end of the rod to clamp the rod to the tube.

2. In a relay, in combination, a support rack, a holding rod carried by the rack and extending forwardly therefrom, a relay mechanism, a casting receiving the mechanism and having a rear flange, a tube carried by the casting, an enclosing casing for the mechanism having one open end butted against the flange on the casting when in position to enclose the mechanism, the tube extending through one face of the casing to the outside thereof when the casing is in enclosing position, holding means on the outer end of the tube for clamping the casing against the casting, a seal preventing removing the holding means except after the seal is broken, the rod extending through the tube and projecting beyond said holding means, and means on the outer end of the rod to clamp the rod to the tube.

3. In a relay, in combination, a support rack, a holding rod fixed to the rack and extending forwardly therefrom, a relay mechanism, a base member receiving the mechanism, a tube fixed to the base member, an enclosing casing for the mechanism and base member, the tube extending through one face of the casing to the outside thereof, holding means on the outer end of the tube for clamping the casing to the base member, the rod extending through the tube and projecting beyond said holding means, and means on the outer end of the rod to clamp the rod to the tube.

4. In a relay, in combination, a support rack, a holding rod carried by the rack and extending forwardly therefrom, a relay mechanism, a support means receiving the mechanism and having a rear flange, a tube carried by the support means, an enclosing casing for the mechanism having one open end butted against the flange on the support means when in position to enclose the mechanism, the tube extending through one face of the casing to the outside thereof when the casing is in enclosing position, holding means on the outer end of the tube for clamping the casing against the support means, a seal preventing removing the holding means except after the seal is broken, the rod extending through the tube and projecting beyond said holding means, and means on the outer end of the rod to clamp the rod to the tube.

JOSEPH F. MERKEL.